United States Patent [19]

Stricharczuk et al.

[11] 4,188,448

[45] Feb. 12, 1980

[54] STEREO RETICULATED POLYMERIC LACE-LIKE STRUCTURE AND PROCESS FOR MAKING THE SAME

[75] Inventors: Paul T. Stricharczuk, Solon; Dennis L. Lawson, Brunswick, both of Ohio

[73] Assignee: The B. F. Goodrich Company, Akron, Ohio

[21] Appl. No.: 812,024

[22] Filed: Jun. 30, 1977

Related U.S. Application Data

[62] Division of Ser. No. 659,412, Feb. 19, 1976, Pat. No. 4,062,915.

[51] Int. Cl.$^2$ .......................... B32B 3/26; B32B 5/18
[52] U.S. Cl. ................................... 428/311; 428/236; 428/253; 428/310; 521/52
[58] Field of Search ................ 264/DIG. 8, DIG. 47, 264/47, 51, 147, 210 R, 290 R, 280; 428/253, 236, 310, 311; 521/52

[56] References Cited

U.S. PATENT DOCUMENTS

| | | | |
|---|---|---|---|
| 3,539,666 | 11/1970 | Schirmer | 264/210 R |
| 3,594,337 | 7/1971 | Shea | 260/2.5 BE |
| 3,634,564 | 1/1972 | Okamoto | 264/DIG. 47 |
| 3,796,778 | 3/1974 | Gallacher | 264/DIG. 8 |
| 3,874,965 | 4/1975 | Greenwald | 264/DIG. 8 |
| 3,954,928 | 5/1976 | Omori | 264/DIG. 8 |
| 3,962,388 | 6/1976 | Driscoll | 264/DIG. 8 |
| 3,965,229 | 6/1976 | Driscoll | 264/DIG. 8 |
| 3,969,472 | 7/1976 | Driscoll | 264/DIG. 8 |

FOREIGN PATENT DOCUMENTS 1165934 10/1969 United Kingdom ............ 264/DIG. 8

*Primary Examiner*—Marion E. McCamish
*Attorney, Agent, or Firm*—Roy P. Wymbs

[57] ABSTRACT

The present invention relates to a stereo reticulated lace-like structure formed from a mixture of polymeric materials, which structure is formed by extruding a film of the polymeric mixture and simultaneously imparting a cellular or reticulate structure to said film by means of a blowing agent. The resultant stereo reticulated structure has the appearance of overlapping layers of fibers or fibrils with small interstices therebetween even though the structure is formed from a continuous film.

6 Claims, 2 Drawing Figures

BLEND OF POLYURETHANE AND ACRYLIC TERPOLYMER

POLYURETHANE

BLEND OF POLYURETHANE AND ACRYLIC TERPOLYMER

STEREO RETICULATED POLYMERIC LACE-LIKE STRUCTURE AND PROCESS FOR MAKING THE SAME

This is a division of application Ser. No. 659,412, filed Feb. 19, 1976, now U.S. Pat. No. 4,062,915, issued Dec. 13, 1977.

BACKGROUND OF THE INVENTION

Non-woven fabrics are well known and have many varied uses, particularly in the textile industry. Such non-woven materials are useful as interliners for adhesive purposes or for support with fabrics and films. In many instances, the non-wovens can be made self-supporting and then used in fabricating garments, particularly where such garments are used one time and then discarded, such as in hospital operating rooms, and the like. These non-woven materials are made from a variety of fibers, such as, for example, cotton, wool, flax, glass, viscose rayon, cellulose acetate, acrylonitrile polymers (acrylics), polyamides (nylon), polyesters, etc. However, most of the known methods for producing non-woven fabrics from said fibers involve expensive and time consuming steps.

As an example of such time and expense is the manufacture of non-wovens from polymeric materials, such as acrylonitrile polymers, polyamides, polyesters, polyurethanes, and the like. First of all, the polymer must be spun in the form of a bundle of continuous filaments, treated and washed, cut into staple fibers, dried and baled. Thereafter, at a textile mill, the fibers are further treated, as by carding, to form a web in which the fibers are randomly distributed. Then the fibers are bonded together at the crossover points, i.e., wherever they cross or come in contact with another fiber. Such bonding is usually done with the use of adhesive compositions or by heating the fibers so that they soften sufficiently and fuse with other fibers at the contact points. Most of such non-woven fabrics tend to be stiff and have a harsh hand.

A recently developed process is being employed to overcome the aforesaid difficulties. In this process, the polymeric material is melted and passed through an extruder to a forming or shaping die. The polymeric material is extruded in the form of a film and immediately formed into a cellular or reticulated structure by means of a blowing agent. Overlapping of fibrils results in the structure and the material has the appearance of a non-woven fabric and is useful in the same end uses. This process has proved successful with many polymeric materials, such as polyethylene and the like. However, when making a lace-like structure from polyurethane, using said process, the hole size of the product formed is frequently too large and also nonuniform to give a commercially useful product. Polyurethanes are particularly useful for this kind of product since they impart good flexibility and have good binding properties. However, it is desirable to have a stiffer hand in the reticulate lace-like structure. Therefore, means of producing a reticulate lace-like structure from polyurethanes wherein the fiber structure changes sufficiently to give small holes and good uniformity thereof, along with a stiffer hand, is most desirable.

SUMMARY OF THE INVENTION

It has unexpectedly been found that a stereo reticulated lace-like structure can be produced from a polyurethane which has greatly reduced hole size, more overlapping fibers or fibrils and multiple layers thereof, more uniform hole size, and a stiffer hand. This reticulated structure is obtained by extruding a polymeric blend comprising a polyurethane and a polymer selected from acrylic polymers, polyamides and a polymer formed from acrylonitrile-butadiene-styrene (ABS). The polymeric mixture or blend is extruded in the form of a film and simultaneously given a cellular or stereo reticulate structure by means of a blowing agent.

DETAILED DESCRIPTION

Figure 1:
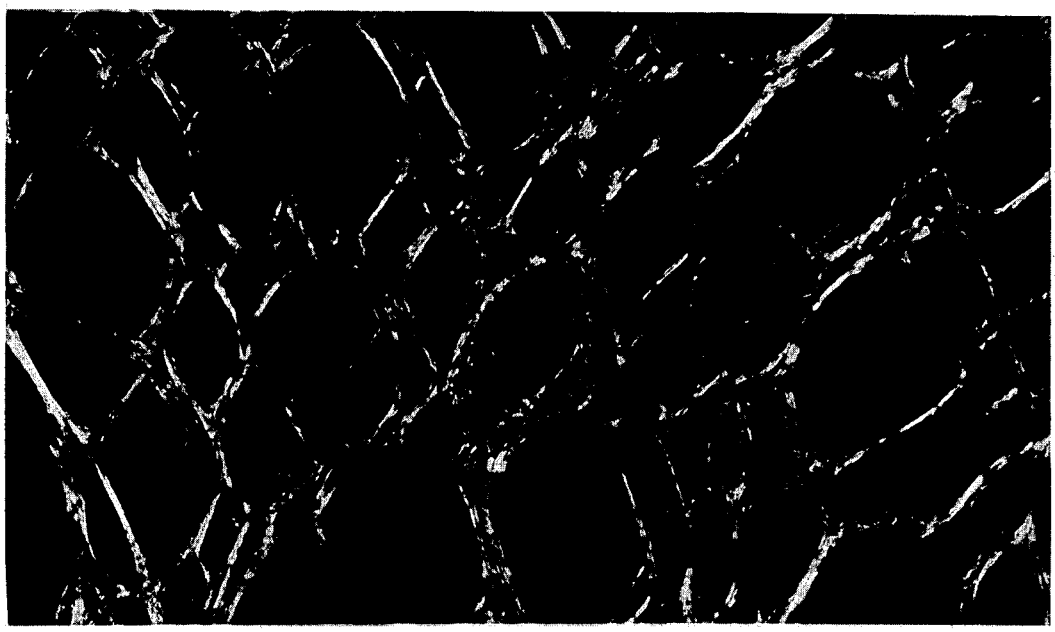
Figure 2:
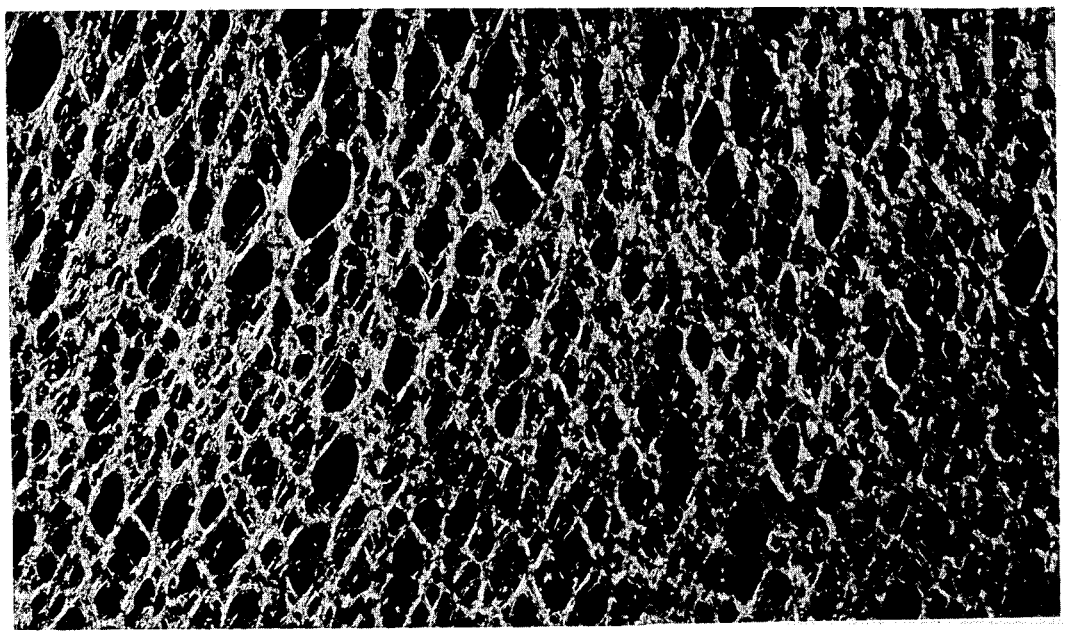

In connection with the description of the invention which follows, reference is made to the drawing in which:

FIG. 1, is a photomicrograph of a reticulated lace-like structure or web made from polyurethane alone; and FIG. 2, is a photomicrograph of a stereo reticulated lace-like structure or web made from a polymer blend of a polyurethane and an acrylic terpolymer.

The polyurethane elastomers useful in the practice of the present invention are those which are substantially free of cross-links. These elastomers are prepared by reacting 1.0 mol of an essentially linear hydroxyl-terminated polyester having a molecular weight between about 600 and about 2500 with about 1.1 to 3.1 mols of a diphenyl diisocyanate in the presence of about 0.1 to 2.1 mols of a free glycol containing from 4 to 10 carbon atoms. The ratio of free glycol to diphenyl diisocyanate must be balanced so that there is essentially no free unreacted diisocyanate or glycol remaining after the reaction to form the elastomer. The amount of glycol employed will depend upon the molecular weight of the polyester used. The elastomer is formed by heating the mixture of reactants.

Useful polyesters include those prepared from the esterification of such dicarboxylic acids as adipic, succinic, pimelic, suberic, azelaic, sebacic, and the like or their anhydrides. Preferred dicarboxylic acids are those having the formula HOOC—R—COOH, where R is an alkylene radical containing 2 to 8 carbon atoms.

The glycols utilized in the preparation of the polyester by reaction with the aliphatic dicarboxylic acid are straight chain glycols containing between 4 and 10 carbon atoms, such as butanediol-1,4, hexamethylenediol-1,6, octamethylenediol-1,8, and the like. In general, glycols having the formula $HO(CH_2)_xOH$, where x is a number from 4 to 8, are employed.

In making the polyurethane elastomers, a diphenyl diisocyanate is employed, such as 4,4'-diphenyl methane diisocyanate, diphenyl methane-p,p'-diisocyanate, dichlorodiphenyl methane diisocyanate, dimethyl diphenyl methane diisocyanate, diphenyl dimethyl methane diisocyanate, dibenzyl diisocyanate, diphenyl ether diisocyanate, and the like. The amount of diphenyl diisocyanate used is dependent upon the amount of free glycol and polyester and should be an amount equivalent to these latter two reactants so that there are essentially no free unreacted isocyanate and hydroxyl groups remaining in the reaction product. A convenient method for determining how much glycol to add to the polyester prior to reaction of the mixture of polyester and glycol with the diphenyl diisocyanate is to add enough glycol to the polyester so that the mixture has an average hydroxyl number molecular weight of about 400 to 800 and more preferably from 400 to 550. It will be apparent that the higher the molecular weight of the polyester the more glycol that will be required to obtain the desired hydroxyl content in the mixture of free glycol and polyester.

The acrylic polymers useful in blending with the polyurethane elastomers, in the practice of the present invention, are those comprising in 100 parts by weight of resin from about 40 to 97 parts by weight of a lower acrylic acid ester, from about 0 to 45 parts by weight of a methacrylic acid ester and from about 3 to 15 parts by weight of an α,β-olefinically unsaturated carboxylic acid having a terminal $CH_2=C$ group and having from 3 to 4 carbon atoms. These acrylic polymers can be represented by the formula:

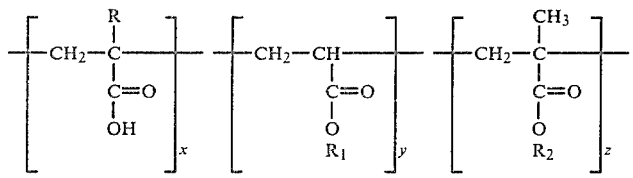

wherein R represents hydrogen and methyl, $R_1$ represents an alkyl radical having 1 to 10 carbon atoms, such as methyl, ethyl, propyl and decyl, $R_2$ represents methyl and ethyl, x represents from 3 to 15 weight percent based on the combined weight of x, y and z; y represents from 40 to 97 weight percent based on the combined weight of x, y and z; z represents from 0 to 45 weight percent based on the combined weights of x, y and z; the sum of numerical values of x plus y plus z is always 100 and the groups x, y and z are present in the polymer in a heterogeneous relative order.

The lower acrylic acid esters useful in making the polymers or resins for the present invention include those in which $R_1$ in the above formula is an aliphatic hydrocarbon group having from 1 to 10 carbon atoms, such as methyl acrylate, ethyl acrylate, n-propyl acrylate, isopropyl acrylate, 2-ethylhexyl acrylate, n-butyl acrylate, isobutyl acrylate, and secondary butyl acrylate. The most preferred lower acrylic acid esters are methyl acrylate and ethyl acrylate.

The lower methacrylic acid esters useful in this invention include those in which $R_2$ in the above formula is an aliphatic hydrocarbon group having from 1 to 2 carbon atoms, such as methyl methacrylate, and ethyl methacrylate, the preferred compound or monomer being methyl methacrylate.

The α,β-olefinically unsaturated carboxylic acids include acrylic acid and methacrylic acid.

The acrylic polymers or terpolymers used in the present invention are prepared by well-known polymerization techniques, for example, bulk, solvent, suspension and emulsion polymerization. Terpolymers of lower alkyl acrylates, lower alkyl methacrylates and acrylic or methacrylic acids are shown and described in U.S. Pat. Nos. 2,760,886; 2,790,735; 2,934,509; 3,454,509; and 3,460,945, among others. When making these terpolymers, the polymerization reaction is catalyzed by a free radical generating catalyst, such as a peroxide or a hydroperoxide. Among the typical useful catalysts of this type, there may be named as examples hydrogen peroxide, benzoyl peroxide, caproic peroxide, tertiary butyl peroxide, caprylyl peroxide, cumene hydroperoxide, and the like. Various other additives may be employed in the polymerization reaction, such as dispersants, emulsifiers, and the like, as is well-known to those skilled in the art.

The mixture or blend of polymers of the present invention may be made in any desirable way, such as melt blending, for example. However, it is preferred to mix or blend the polymers while dry and in a granular condition. This can be accomplished using any conventional equipment for blending dry polymers or other materials, such as roll mixers, and the like. When blending the polymers, it is sufficient to use an amount of the acrylic polymer of about 3 to about 25 parts by weight, based upon 100 parts by weight of the polyurethane polymer. Preferably, an amount of acrylic polymer in the range of about 3 to about 15 parts by weight is employed.

It has been found desirable, and in many cases necessary, to employ a lubricant in the polymer blend. The reason for this is that when the reticulated structure is passed over a guide roll or through a pair of nip feed rolls to the windup roll, it has a tendency to stick to said rolls. Also, blocking can occur on the windup roll and when trying to unwind the reticulated structure therefrom, it has a tendency to stick to itself making unwinding difficult, if not impossible in many cases. We have found that the use of small amounts of a paraffin wax in the polymer blend alleviates the problems of sticking and blocking. Usually, an amount of paraffin wax in the range of about 0.1 part to about 3 parts by weight, based upon 100 parts by weight of the polyurethane polymer, is sufficient. Preferably, 0.1 part to 2 parts by weight of paraffin wax are employed.

The paraffin wax may be added to the polymer blend in different ways. For example, the wax may be dry blended in the polymer blend as by tumbling and rolling in a drum. In fact, the wax can be blended in at the same time that the polyurethane polymer and acrylic terpolymer are dry blended together. It has been found, however, that improved distribution and balance of the wax in the polymer blend is achieved if the wax is added to the polymerization mix or recipe prior to polymerization when making the polyurethane polymer.

In order to obtain the cellular or stereo reticulated lace-like structure of the instant invention, a suitable blowing agent is employed in the polymer blend. The blowing agent is dry blended in the polymer blend. The polymer blend is now a homogeneous foamable composition which is fed into a hopper which feeds a conventional screw extruder. The extruder and the annular extrusion die attached to the exit end thereof are heated by any suitable means, such as by electrical resistance type band heaters, and the like. The polymer blend is maintained in unfoamed condition in the extruder by means of pressure until its exit from the die into an area of atmospheric pressure. Upon exiting from the die, the pressure is released on the gaseous material formed from the blowing agent thus causing a cellular structure in the extrudate to form a lace-like reticulated material, or fabric, such as shown in FIG. 2 of the drawing.

Various blowing agents, or foaming agents, are useful in the present invention. Such agents as will produce, or cause to be produced, a normally gaseous material at the conditions of extrusion, such as nitrogen, for example, are most useful, although other chemically or physically decomposable blowing agents are useful. The particular blowing agent employed is dependent upon the polymer blend used and the properties desired in the final reticulated material. With regard to chemical blowing agents, which may be used in the present invention, are the azo-, N-nitroso- and sulfonyl hydrazide compounds such as, for example, azobisformamide, azobisisobutyronitrile, diazoaminobenzene, p,p'-oxybis-(benzenesulfonylhydrazide), N,N'-dinitrosopentamethylenetetraamine, p,p'-azobis-(benzenesulfonylsemicarbonamide), diethylazoisobutyrate, 1,3-bis-(xenyl)triazine, 4,4'-oxybis-(benzenesulfonylhydrazide), and the like, p,p'-oxybis-(benzenesulfonylsemicarbazide), barium azodicarboxylate, sodium borohydride, and the like. Physical blowing agents include such compounds as the low boiling liquid hydrocarbons, such as hexane, heptane, pentane, etc., dichlorodifluoromethane, trichlorofluoromethane, 1,2-dichlorotetrafluoroethane, and the like. Usually an amount of a blowing agent in the range of about 0.1 to about 2 weight parts per 100 weight parts of polymer blend is sufficient to achieve the objects of the present invention. The blowing agent is used in amounts of from about 0.1 to about 3.0 weight parts per 100 weight parts of polymer blend.

In those instances where it is necessary to use high extrusion temperatures in order to get proper gas release from the blowing agents, and there is concern about polymer degradation, various catalysts or activators may be employed which generally lower the temperatures of gas release of the blowing agents. These blowing activators are known to those skilled in the art and include, among others, such compounds as metal soaps and metal salts and oxides. As examples, there may be named lead stearate, zinc stearate, titanium dioxide, silica, salts of zinc, lead, barium, cadmium, and the like.

In addition to the blowing agents mentioned above, an inert gas, such as freon, can be employed. This is accomplished by injecting the gas into the extruder through a port in that section wherein the polymer blend is in the molten state. The gas is under pressure and expands causing foaming upon leaving the extrusion die into the atmosphere.

In making the cellular or stereo reticulated lace-like structure or fabric of the present invention the polymer blend is fed to an extruder by means of a hopper mounted thereon. The extruder used is of the screw type and may be of any particular size. We have found, however, that a 3½ inch line produces very good results. An extrusion die having an annular opening therein is mounted on the exit end of the screw extruder and both the extruder and annular die are heated by suitable means, as hereinbefore pointed out. The extruder and die are maintained at a temperature in the range of about 300° F. to about 400° F. Preferably, the temperature is maintained in the range of 340° F. to 380° F. In actual commercial practice the temperature will vary along the length of the extruder and the die but within the ranges of temperature given above. For example, in a typical run the temperature in the solids section of the screw extruder will be 370° F., in the melt section 380° F. and in the die 370° F. The temperature regulation is dependent on a number of conditions, such as the size and shape of the screw, the rpm of the screw, the dwell time of the melt in the extruder, since a too long dwell time may cause some degradation of the polymers which is to be avoided.

The annular opening in the die may be of any convenient size in diameter depending upon such factors as rate of extrusion, size of the expander ring, hereinafter described, width of the finished fabric, and the like. We have found that for the purposes of our invention, an annular opening having a diameter of about 12 inches is satisfactory.

The foamed reticulated fabric is drawn from the annular opening in the die by means of an expander ring which has a diameter about 2 to 5 times that of the annular die opening. A diameter of about 48 inches has been found to be satisfactory. The expander ring is segmented and each segment is positively rotated about its own axis in the direction of travel of the fabric. Thus the fabric is attenuated as it passes over the expander ring and the holes therein, formed by the blowing agent, are extended or stretched in the longitudinal direction. The expansion of the gas from the blowing agent causes the formation of a myriad of fibrils, which are readily discernible in FIG. 2 of the drawing.

Immediately after immergence from the die, and prior to the expander ring, the reticulated structure, or fabric, is quenched with air at room temperature. The cooling is accomplished by means of a cooling ring mounted adjacent the exit end of the die and having a series of openings or jets around the inner periphery thereof. The openings are located so that the jets of air are directed against the emerging reticulated fabric in a direction away from the die so as not to cool the die. Usually it is necessary to bring the temperature of the fabric down close to the hardening temperature of the polymer blend. The reason for this is to build up the viscosity of the polymer blend so that it may be oriented to a high degree. Since this cooling of the emerging reticulated fabric must be done quickly, it is sometimes desirable, or even necessary, to precool the air prior to contacting the fabric. Whether or not precooling of the air is necessary depends on the rate of extrusion, and other working conditions.

The orientation or setting of the reticulated lace-like structure or fabric is biaxial, that is, both in the longitudinal and transverse directions. The orientation or setting takes place between the extrusion die and the expander ring. The segmented expander ring is driven at such a speed that not only does the expansion of the tubular fabric going from the die diameter to the diameter of the ring contribute to the orientation but also the stretching thereof due to the speed of the expander ring. This orientation is also referred to as radial orientation. This radial orientation can be assisted by slowly rotating the die at 1 rpm. or less. This rotation also contributes to the uniformity of the fabric.

Biaxial orientation of the reticulated structure imparts high tensile strength thereto. However, one must be careful not to overstretch since this will reduce the strength of the structure or fabric. Generally, the reticulated structure is stretched in both the longitudinal and transverse direction at least twice its original dimension. Preferably, the stretching will be in the range of 2 to 12 times the original dimension. Generally, the orientation in the longitudinal direction is higher than in the transverse direction.

After orientation, the reticulated fabric passes between the feed rolls to a windup roll, which is rotated at the same speed as the feed rolls. Since the reticulated fabric is extruded in the form of a tube, it is wound up as double ply fabric. However, if it is desired to wind the fabric in single plies, two wind up rolls can be used. A slitting means can be employed between the feed rolls and the windup rolls and the edges of the fabric slit or cut thus separating the fabric into 2 single plies each of which is wound separately.

The weight of the reticulated fabric can be varied over a wide range by changing the width of the annular opening in the extrusion die and also by adjusting the rate of extrusion. Generally, a fabric having a single ply weight in the range of 0.2 to 4.0 ounces per square yard is satisfactory. Where the reticulated fabric is to be used as an adhesive interlayer in a laminated fabric structure, a weight of 0.5 to 1.0 oz./sq.yd. is sufficient. Of course, increased weight can be obtained by employing more than one ply of the reticulated fabric.

In the present invention finely divided fillers can be employed in the polymer blend prior to extrusion thereof. The small particle size fillers do not affect void structure but they do tend to promote fiber formation with fewer and smaller film-like junction areas. Most of the well known filler materials may be used in the present invention. These fillers are usually inorganic materials, such as calcium salts, for example. We have found that diatomacious earth is particularly useful in our polymer blends.

In the following example, which is merely intended in an illustrative and not a limitative sense, a series of runs were made using varying polymeric compositions. In the example, all parts and percents are by weight unless otherwise indicated.

The polyurethane used in the runs was made by reacting together an adipate glycol, 1,4-butanediol and a diisocyanate in accordance with the process described in U.S. Pat. No. 2,871,218 to Schollenberger. In addition to the compounds listed above, 2 parts of paraffin wax was added prior to polymerization with the compounds constituting 100 parts. When polymerization was complete, the polyurethane was cooled and set and then granulated. Several blends of the polyurethane were then made with varying amounts of a granular acrylic terpolymer having the following composition: ethyl acrylate—58%; methyl methacrylate—32%; and acrylic acid—10%. The polyurethane, acrylic terpolymer and chemical blowing agent were dry blended by tumbling in a drum. The blowing agent employed was Ficel EPA, an azo dicarbonamide blowing agent.

The polymer blend was then extruded to form the reticulated lace-like fabric. A 3½ inch extruder was used and Table I shows typical extruder and line conditions employed for polyurethane alone and when blended with the acrylic terpolymer.

TABLE I

| Polymer | Blowing Agent % | Extrusion Temp., °F. Melt | Extrusion Temp., °F. Die | RPM | AMPS | Expander Roll Speed Ft./Min. | Draw rolls Speed Ft./Min. | Basis Weight Oz/sq. yd. (2 ply) |
|---|---|---|---|---|---|---|---|---|
| Polyurethane | 1 | 370 | 360 | 20 | 45 | 54 | 58 | 1.03 |
| Polyurethane + Acrylic polymer | 1.25 | 380 | 370 | 22 | 45 | 37 | 42 | 1.08 |

The products produced are shown in FIGS. 1 and 2 of the drawing which are photomicrographs taken at a magnification of 3X. The difference in hole size and overall structure can be clearly seen in the Figures. More importantly, the fabric from the polymer blend has a stiffer hand which is desirable, particularly with respect to ease of handling in subsequent operations. The degree of fibrillation, or the amount of formation of fibrils, was good for polyurethane alone and excellent for the polymer blend.

The following table shows data of other runs, including the use of freon as the blowing agent. The degree of fibrillation is determined by visual examination of the fabrics under magnification. In the table, Poly-U is 100 parts polyurethane, ATP is acrylic terpolymer, and EPA is the azo dicarbonamide blowing agent, all as hereinabove described.

TABLE II

| Run No. | Polymer | Blowing Agent | Extrusion Temp. of Melt | Extrusion Temp. of Die | RPM | AMPS | Expander Roll Speed Ft./min. | Draw Rolls Speed Ft./min. | Basis Weight Oz./sq.yd. | Degree of Fibrillation |
|---|---|---|---|---|---|---|---|---|---|---|
| 1 | Poly-U. - 100 pts. | Freon | 380 | 370 | 14 | 50 | 31 | 38 | 1.00 | Medium |
| 2 | Poly-U. - 100 pts. | EPA-0.5% | 370 | 350 | 13 | 50 | 37-71 | 37-76 | 0.40 | Good |
| 3 | Poly-U. - 100 pts. | EPA-1.0% | 365 | 340 | 14 | 62 | 79 | 83 | 0.63 | Good |
| 4 | Poly-U. - 100 pts. ATP - 15 pts. | EPA-1.0% | 350 | 345 | 21 | 40 | 68 | 73 | 0.85 | Excellent |
| 5 | Poly-U. - 100 pts. ATP - 7.5 pts. | EPA-1.0% | 350 | 345 | 21 | 48 | 68 | 73 | 0.92 | Excellent |
| 6 | Poly-U. - 100 pts. ATP - 3.75 pts. | EPA-1.0% | 330 | 330 | 22 | 57 | 58 | 62 | 0.86 | Medium |
| 7 | Poly-U. - 100 pts. ATP - 15 pts. | EPA-1.0% | 335 | 345 | 22 | 58 | 58 | 62 | 0.86 | Medium |
| 8 | Poly-U. - 100 pts. ATP - 3.75 pts. | EPA-1.0% | 345 | 350 | 12 | 45 | 43 | 47 | 0.66 | Good |
| 9 | Poly-U. - 100 pts. ATP - 7.5 pts. | EPA-1.0% | 350 | 350 | 18 | 60 | 44 | 53 | 0.84 | Excellent |

Again we see the superior results obtained when an acrylic polymer is blended with the polyurethane. In all the runs made the reticulated lace-like fabric did not stick to the expander roll nor the feed rolls and further, no blocking occurred on the windup roll. This was due to the presence of the paraffin wax. It is noted that when the extrusion temperature is lowered it affects the results in the finished product.

The reticulated lace-like fabrics produced in the Example were employed as adhesive interlayers in laminated or heat pressed fabrics, such as polyester cotton—polyester cotton, polyester knit—polyester knit, denim—denim, nylon—nylon, and like. The bonding temperature varies with the fabric and the type platens used. Temperatures in the range of 225° to 400° F. were employed. Using the "T-Peel Test" (ASTM Test No. D1876) wherein the angle of peel is 90°, T-Peel strenths in the range of 2.0 to 7.0 pounds per square inch were obtained. The T-Peel strengths are in the range of good to excellent for this type of reticulated fabric and obtained along with a stiffer hand and smaller hole size and increased number of fibrils or increased fibrillation.

The addition of the acrylic polymer tightens the network structure, improves extrusion stability and promotes product uniformity. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A stereo reticulated lace-like structure formed from a polymeric blend of (A) a polyurethane substantially free of cross-links made by the reaction of (1) an essentially linear hydroxyl terminated polyester made by the reaction of a dicarboxylic acid having the formula HOOC—R—COOH wherein R is an alkylene radical containing 2 to 8 carbon atoms with a glycol having the formula $HO(CH_2)_xOH$ wherein x is a number from 4 to 8; (2) a free glycol containing from 4 to 10 carbon atoms; and (3) a diphenyl diisocyanate, (B) an acrylic polymer comprising in 100 weight parts of polymer from about 40 to 97 weight parts of a lower acrylic acid ester, from 0 to 45 weight parts of a methacrylic acid ester, and from about 3 to 15 weight parts of an $\alpha,\beta$-olefinically unsaturated carboxylic acid having a terminal $CH_2=C<$ group and containing from 3 to 4 carbon atoms, and (C) from about 0.1 to about 3.0 parts by weight, based on the weight of the polyurethane of a lubricant, said structure being non-woven containing a multiplicity of overlapping oriented fibrils in the plane of the non-woven structure and having a single ply basis weight in the range of about 0.2 to 4.0 ounces per square yard.

2. A structure as defined in claim 1 wherein the lubricant is paraffin wax.

3. A structure as defined in claim 1 wherein (B) is a terpolymer containing by weight about 58% ethyl acrylate, 32% methyl methacrylate and 10% acrylic acid.

4. A structure as defined in claim 1 wherein (A) is formed from (1) an adipate glycol, (2) 1,4-butanediol and (3) a diphenyl diisocyanate.

5. A structure as defined in claim 4 wherein (B) is a terpolymer containing by weight about 58% ethyl acrylate, 32% methyl methacrylate and 10% acrylic acid.

6. A structure as defined in claim 1 characterized by having a T-Peel strength in the range of about 2.0 to about 7.0 pounds per square inch when laminated between two layers of woven or knit fabric.

* * * * *